(12) United States Patent
Norton et al.

(10) Patent No.: US 8,978,353 B2
(45) Date of Patent: Mar. 17, 2015

(54) SYSTEMS AND METHODS FOR USING AN ENDOTHERMIC FUEL WITH A HIGH HEAT SINK CAPACITY FOR AIRCRAFT WASTE HEAT REJECTION

(75) Inventors: Daniel G. Norton, Niskayuna, NY (US); Robert J. Perry, Niskayuna, NY (US); John Osaheni, Clifton Park, NY (US); Patrick Pastecki, Pearland, TX (US); Paul Glaser, Albany, NY (US); Ashish B. Mhadeshwar, Storrs, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 1114 days.

(21) Appl. No.: 13/118,800

(22) Filed: May 31, 2011

(65) Prior Publication Data
US 2012/0305712 A1    Dec. 6, 2012

(51) Int. Cl.
B64D 37/02    (2006.01)
B64D 37/30    (2006.01)
B64D 37/34    (2006.01)

(52) U.S. Cl.
CPC ............... *B64D 37/02* (2013.01); *B64D 37/30* (2013.01); *B64D 37/34* (2013.01)
USPC .............. 60/39.12; 60/204; 60/266; 208/108; 208/113

(58) Field of Classification Search
CPC ......... B64D 37/02; B64D 37/30; B64D 37/34
USPC ......... 208/108, 113, 106, 118; 60/39.12, 204, 60/266, 267; 422/198, 200, 206
See application file for complete search history.

(56) References Cited

U.S. PATENT DOCUMENTS

| | | | |
|---|---|---|---|
| 4,374,753 A * | 2/1983 | Pullukat et al. | 502/111 |
| 5,149,018 A | 9/1992 | Clark | |
| 5,151,171 A * | 9/1992 | Spadaccini et al. | 208/48 Q |
| 5,165,224 A | 11/1992 | Spadaccini et al. | |
| 5,176,814 A | 1/1993 | Spadaccini et al. | |
| 5,232,672 A | 8/1993 | Spadaccini et al. | |
| 5,275,000 A | 1/1994 | Coffinberry et al. | |
| 5,313,790 A | 5/1994 | Barr | |
| 5,392,595 A * | 2/1995 | Glickstein et al. | 60/780 |
| 5,625,118 A * | 4/1997 | Finkl | 585/899 |
| 5,641,329 A | 6/1997 | Lander et al. | |
| 6,162,956 A * | 12/2000 | Berlowitz et al. | 585/14 |
| 2009/0166001 A1* | 7/2009 | Vanderspurt et al. | 165/104.11 |
| 2010/0236758 A1 | 9/2010 | Ullman et al. | |
| 2011/0067839 A1* | 3/2011 | Norton et al. | 165/104.12 |

OTHER PUBLICATIONS

Michael Y. Wen, Irving Wender, and John W. Tierney, "Hydroisomerization and Hydrocracking of n-Heptane and n-Hexadecane on Solid Superacids", Apr. 30, 1990, pp. 1-7.*

* cited by examiner

*Primary Examiner* — William H Rodriguez
*Assistant Examiner* — Carlos A Rivera
(74) *Attorney, Agent, or Firm* — Reising Ethington P.C.; John J. Snyder

(57) ABSTRACT

Systems and methods for rejecting waste heat generated by one or more operating systems installed on an aircraft employ an endothermic fuel that can participate in endothermic catalytic cracking at temperatures below about 80° C. when exposed to a cracking catalyst that contains a superacid operative to induce low-temperature catalytic cracking of the branched alkanes. The endothermic fuel contains an effective amount of the branched alkanes so that a net endothermic effect is realized when the fuel is exposed to the cracking catalyst. The low-temperature, heat-consuming cracking of the branched alkanes increases the heat sink capacity of the endothermic fuel.

20 Claims, 1 Drawing Sheet

SYSTEMS AND METHODS FOR USING AN ENDOTHERMIC FUEL WITH A HIGH HEAT SINK CAPACITY FOR AIRCRAFT WASTE HEAT REJECTION

CROSS REFERENCES TO RELATED APPLICATION

Not Applicable

STATEMENT REGARDING FEDERALLY SPONSORED RESEARCH OR DEVELOPMENT

Not Applicable

BACKGROUND OF THE INVENTION

Field of the Invention

1. Technical Field

The technical field of this disclosure relates generally to systems and methods for rejecting waste heat generated by operating systems installed on a military aircraft capable of maintaining supersonic speeds. More specifically, the technical field relates to the rejection of waste heat to an endothermic fuel flow that can participate in low-temperature endothermic cracking when exposed to a cracking catalyst.

2. Background

Military aircraft feature a variety of operating systems that generate heat during flight. These operating systems include mechanical, hydraulic, electronic, and power-generation systems that enable the aircraft's full range of capabilities. The waste heat generated by these systems during normal operation needs to be managed. Otherwise, equipment malfunction and undesirable effects associated with aircraft overheating such as, for example, inefficient fuel consumption and the systematic loss of prioritized aircraft functionality may occur.

Numerous thermal management strategies have been designed and implemented over the years to address waste heat generation. A design challenge that underlies many of these strategies is the lack of an efficient heat sink that can accept appreciable quantities of heat without unnecessarily adding weight or impinging upon the functionality of the other operating systems. This general inaccessibility to an opportune heat sink influences aircraft engineering and design decisions. For instance, sophisticated operating systems being developed for current and next-generation military aircraft, especially those with supersonic speed and/or stealth capabilities, have caused overall aircraft power requirements and waste heat production to escalate. Finding ways to efficiently manage this waste heat without sacrificing aircraft performance is becoming more difficult. The fact that many of these aircraft are insulated against external heat loss to prevent the formation of a detectable heat signature compounds this thermal management challenge.

Atmospheric air and on-board fuel are the most conveniently accessible heat transfer fluids that can remove accrued heat from an airborne aircraft. Each of these heat transfer fluids is readily available in-flight. Of these two heat transfer fluids, however, fuel is considered the more efficient and practical heat sink for removing waste heat from an aircraft operating at supersonic speeds. Fuel that originates from the aircraft's fuel reservoir can easily be routed to locations where waste heat is being generated. The heated fuel is then delivered to the aircraft's jet engine(s). An assortment of primary combustion section fuel spray nozzles and/or afterburner spray nozzles contained in the jet engine(s) dispenses the fuel into an air stream, in precise amounts, and fuel combustion proceeds as is generally understood. The combustion of the fuel ultimately removes any captured waste heat from the aircraft as part of the jet engine's exhaust plume.

The rejection of waste heat primarily through radiators supplied with ram air is simply not a feasible option for certain high-speed military aircraft. A principal limitation is the relatively low heat sink capacity of the ram air immediately available to the aircraft. The zone of boundary air in front of an in-flight aircraft undergoes significant compression and viscous heating at flight velocities and altitudes. This localized heating significantly reduces the heat sink capacity of the air that would be available to radiators installed on the aircraft. Another limitation in the use of radiators is their impact on the aircraft's combat radius. Air scoops and other related radiator components not only increase drag but consume precious space within the aircraft. The space allocated to radiators, although seemingly small compared to the size of the aircraft, is not insignificant since military aircraft seek to carry as much fuel as possible to support a combat mission. Any space allocated to radiators generally equates to a corresponding decrease in fuel capacity and range.

On-board fuel is the preferred heat sink for removing rejected waste heat from a military aircraft for several reasons. First, fuel is a consumable liquid with a sufficient thermal mass that is already carried in large quantities in the aircraft's fuel reservoir. Second, the systems employed to contain and route the necessary amount of fuel through the aircraft are not overly burdensome in terms of weight and volume. And third, the chance to heat some fuel prior to combustion promotes efficiency of the jet engine(s) so long as the fuel is not excessively heated to the point where degradative reactions occur. But despite these several advantages, the normal flight dynamics of a military aircraft can depreciate the heat sink capabilities of the aircraft's fuel reserve as flight time progresses.

The ability of fuel to provide effective cooling over prolonged periods is often limited by the inconsistent combustion of fuel over the flight envelope. Several aircraft operating states happen to exist where the fuel demand of the engine(s) is relatively low or nonexistent but an appreciable amount of waste heat is being generated (i.e., idle-descent and subsonic high-altitude cruising). Some or all of the fuel routed through the aircraft to accept the waste heat may be returned to the aircraft's fuel reservoir under such circumstances. This re-circulation of heated fuel can progressively raise the bulk temperature of the fuel reserve contained in the fuel reservoir. The exact temperature gain realized, if any, depends largely on the mass of the fuel reserve and the heat carried by the returned fuel. Rapid temperature increases generally occur, for instance, when warm fuel is circulated back into a smaller fuel reserve that has been significantly depleted during flight evolution and which does not have a large enough thermal mass available to easily absorb the added heat.

A rising temperature in the fuel reserve decreases the available heat sink capacity of any subsequently diverted fuel intended to cool the aircraft's operating systems and, after exceeding a maximum allowable temperature limit, can damage the operating systems (if in direct thermal contact) as well as other delicate electronics and gaskets that engage the fuel. Preventative constraints are usually placed on the aircraft's flight envelope and flight range to prevent excessive heating of the fuel reserve to avoid this type of damage. Combat missions or training sorties may even have to be aborted if the aircraft's fuel reserve approaches the maximum allowable temperature limit.

A number of solutions currently exist that can help slow the rate of temperature rise in a constantly shrinking fuel reserve. One solution involves cryogenically cooling the aircraft's fuel reserve just before fueling. The very cold fuel has a greater heat sink capacity than a fuel at room temperature due to a larger temperature window over which waste heat can be accepted. Another solution involves the use of endothermic fuels that contain a combustible hydrocarbon compound that can be dehydrogenated (i.e., methylcyclohexane) on the aircraft at high-temperatures over a reaction-specific catalyst that typically includes supported catalyst particles. The dehydrogenation of such hydrocarbon compounds is an endothermic reaction that consumes heat from the surrounding fuel. The reaction-initiated heat loss makes additional heat capacity available in the fuel for waste heat storage and delays or reduces temperature gains that may transpire in the fuel reserve as a result of warm fuel re-circulation. All of the combustible hydrocarbons employed in current endothermic fuels require exposure to temperatures in the vicinity of 250° C. to 400° C. to initiate dehydrogenation. Temperatures in this range are typically not prevalent within a supersonic-speed military aircraft but can potentially be found at the leading edges of the wings where viscous heating is most intense.

The current approaches used to manage waste heat in a military aircraft leave much room for improvement. Innovative developments focused on the rejection of waste heat produced by operating systems with ever-increasing sophistication and rising power demands are of much intrigue to the aircraft design community. The ability to sink waste heat into on-board fuel while minimizing bulk temperature increases in the aircraft's fuel reserve would likely permit expansion of the aircraft's flight envelope or range without an offsetting sacrifice to the other. A rather significant contribution to the art would be an endothermic fuel that can participate in an endothermic reaction at relatively low temperatures.

SUMMARY OF THE DISCLOSURE

An endothermic fuel formulated to experience low-temperature endothermic catalytic cracking of branched alkanes and a cracking catalyst operative to facilitate such cracking may be cooperatively used to manage waste heat generated by one or more operating systems installed on a military aircraft. A flow of the endothermic fuel originating from a fuel reservoir that holds a fuel reserve may be brought into thermal communication with one or more operating systems to accept the waste heat. The endothermic fuel flow is exposed to the cracking catalyst before, during, or after accepting the waste heat from the operating systems. The negative heat of reaction associated with cracking the branched alkanes enhances the heat sink capacity of the endothermic fuel flow and, consequently, helps mitigate bulk temperature increases that may occur in the aircraft's fuel reserve if some or all of the endothermic fuel flow is eventually returned to the fuel reservoir. The branched alkanes present in the endothermic fuel can be cracked over the cracking catalyst at temperatures below about 80° C. and as low as about 20° C.

The endothermic fuel contains an effective amount of the branched alkanes so that a net endothermic effect is realized when the fuel is exposed to the cracking catalyst. The endothermic fuel, in general, is a mixture of several different hydrocarbons comprised mostly of branched alkanes, normal alkanes, cyclic alkanes, olefins, and arenes. The branched alkanes and olefins undergo competing endothermic and exothermic reactions, respectively, in the presence of the cracking catalyst while the normal alkanes, cyclic alkanes, and arenes are inert or thermally neutral. More specifically, when exposed to the cracking catalyst at temperatures of about 80° C. or below, the branched alkanes crack into light hydrocarbons and the olefins participate in molecular weight-building oligimerization and dimerization reactions. The effective amount of the branched alkanes needed to achieve a net endothermic is achieved when, upon exposure of the fuel to the cracking catalyst, the heat consumed by cracking the branched alkanes is not thermally offset by the exothermic molecular weight-building reactions that involve olefins. The branched alkanes are preferably C6 to C12 acyclic hydrocarbons that include at least one tertiary or quaternary carbon bond.

The cracking catalyst comprises a superacid operative to induce endothermic catalytic cracking of the branched alkanes at the relatively low temperatures indicated (i.e., below about 80° C.). The superacid is preferably supported on an inert, high-surface area support substrate such as, for example, silica particles that have been conditioned to promote more effective superacid catalytic activity. The amount of the cracking catalyst needed to drive cracking of the branched alkanes depends on a variety of factors. An ample amount that is generally sufficient to effect the heat sink capacity of the endothermic fuel is about 150 grams or greater of the superacid for every kilogram of the endothermic fuel that flows over the cracking catalyst per minute. Several preferred superacids that may be used to construct the cracking catalyst include trifluoromethane sulfonic acid (triflic acid), 1,1,2,2-tetrafluoroethane sulfonic acid (TFESA), perfluoro (2-ethoxyethane) sulfonic acid, fluorosulfonic acid, fluoroantimonic acid (a mixture of antimony pentafluoride and hydrofluoric acid usually at a molar ratio of 1.0±0.5), magic acid (a mixture of antimony pentafluoride and fluorosulfonic acid usually at a molar ratio of 1.0±0.5), and mixtures thereof.

The endothermic fuel and the cracking catalyst may be cooperatively used in a fuel circulation system that continuously routes an endothermic fuel flow throughout the aircraft and into thermal communication with one or more of the aircraft's operating systems to accept waste heat. The fuel circulation system includes a fuel reservoir that stores a reserve of the endothermic fuel, a jet engine configured to selectively receive and combust a variable amount of the endothermic fuel, a fuel delivery passage in fluid communication with the fuel reservoir and the jet engine, a fuel return passage in fluid communication with the fuel delivery passage and the fuel reservoir, and a cracking catalyst cell situated in fluid communication with the fuel delivery passage and/or the fuel return passage and exposed to the endothermic fuel flow.

The fuel delivery conduit brings the endothermic fuel flow, which originates from the fuel reservoir, into thermal communication with the operating systems. Thermal communication may be achieved through either an indirect or direct heat transfer configuration, or both. After accepting the generated waste heat, the endothermic fuel flow is made available to the jet engine for combustion. The combustion of the endothermic fuel in the jet engine generates thrust for the aircraft's propulsion needs and also rejects any captured waste heat to the surrounding atmosphere. The jet engine may combust some, all, or none of the endothermic fuel flow depending on the current fuel-burn rate necessitated by the aircraft. Any portion of the endothermic fuel flow not combusted is eventually circulated back to the fuel reservoir through the fuel return conduit and mixed with the remaining fuel reserve. The return of warmer fuel, over time, may progressively increase the bulk temperature of the endothermic fuel reserve.

The endothermic fuel flow is exposed to the cracking catalyst cell at some point in the fuel circulation system to initiate catalytic cracking of the branched alkanes. The cracking catalyst cell is an immobilized compilation of the cracking catalyst located within the flow path of the endothermic fuel flow and which includes an ample amount of the superacid(s) employed to facilitate low-temperature cracking of the branched alkanes. The catalyzed cracking of the branched alkanes is an endothermic reaction that removes locally available heat from the endothermic fuel flow. The heat sink capacity of the endothermic fuel flow, as a result, is enhanced because only the waste heat accepted from the operating systems but not consumed by the cracking reaction may actually contribute to a temperature increase. Such cracking-induced heat sink capacity gains help minimize the rate of bulk temperature increase that may result in the fuel reserve if some or all of the endothermic fuel flow is repeatedly returned to the fuel reservoir throughout the flight.

DETAILED DESCRIPTION

Figure 1:
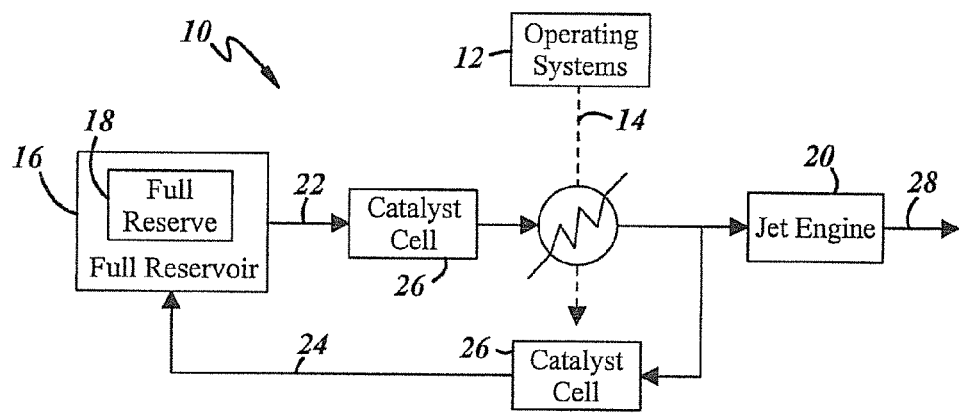
FIG. 1 generally and schematically depicts a fuel circulation system that brings an endothermic fuel flow capable of low temperature cracking, into thermal communication with one or more operating systems installed on a military aircraft to accept waste heat.

A military aircraft (hereafter "aircraft") may be propelled by an endothermic fuel that can participate in endothermic catalytic cracking at temperatures below about 80° C., and down to about 20° C., when exposed to a cracking catalyst that includes a superacid operative to facilitate such cracking. The endothermic fuel, which contains branched alkanes, and the cracking catalyst may be cooperatively used in a fuel circulation system that continuously routes an endothermic fuel flow throughout the aircraft and into thermal communication with one or more of the aircraft's operating systems to accept waste heat. The low-temperature catalytic cracking of the branched alkanes enhances the heat sink capacity of the endothermic fuel which, in turn, allows the fuel to accept more waste heat from the aircraft's operating systems without experiencing an unmitigated temperature increase. The fuel circulation system may be employed in a variety of different aircraft including current and next-generation platform designs that incorporate stealth capabilities and permit sustained travel at speeds greater than Mach 1. Several examples of current in-service aircraft platforms of this type are the F-16 Falcon, the F-22 Raptor, and the F-35 Lightning.

The endothermic fuel contains an effective amount of the branched alkanes so that a net endothermic effect is realized when the fuel is exposed to the cracking catalyst. The effective amount of the branched alkanes is related to the amount of olefins present in the endothermic fuel as those two types of hydrocarbons experience thermally competing catalytic reactions at the relatively low temperatures indicated (i.e., about 20° C. to about 80° C.). The branched alkanes crack primarily into light hydrocarbons (i.e., C4-C6 hydrocarbons such as isobutene, pentanes, and hexanes) while the olefins participate in molecular weight-building reactions such as olefin oligimerization and dimerization. The catalyzed cracking of the branched alkanes is an endothermic reaction that consumes heat and enhances the heat sink capacity of the surrounding endothermic fuel. The catalyzed molecular weight-building reactions involving olefins are exothermic reactions that release heat.

Exactly what constitutes the effective amount of the branched alkanes is subject to variation depending on the amount of olefins present in the fuel, the particular chemical identities of the branched alkanes and the olefins, and the composition of the cracking catalyst. But, in general, the amount of the branched alkanes included in the endothermic fuel is chosen to ensure the heat consumed by cracking of the branched alkanes is not thermally offset by exothermic molecular weight-building reactions involving the olefins. The maximum amount of sulfur-containing compounds present in the endothermic fuel is also preferably limited to recognize more effective cracking of the branched alkanes. Common sulfur-containing compounds such as thiols, sulfides, disulfides, thiophenes, benzothiophenes, and dibenzothiophenes do not necessarily react exothermically like olefins in the presence of the cracking catalyst; they may, however, form surface deposits on the cracking catalyst and interfere with the catalyzed cracking of the branched alkanes.

A preferred formulation for the endothermic fuel, taking into consideration the various competing behaviors of the fuel's possible constituent compounds, contains greater than 10 wt. % branched alkanes, less than 5 wt. % olefins, and less than 3000 ppm sulfur-containing compounds, all based on the weight of the endothermic fuel. A more preferred formulation contains greater than 30 wt. % branched alkanes, less than 3 wt. % olefins, and less than 1000 ppm sulfur-containing compounds while a most preferred formulation contains greater than 50 wt. % branched alkanes, less than 0.5 wt. % olefins, and less than 100 ppm sulfur-containing compounds.

The branched alkanes included in the endothermic fuel are preferably C6 to C12 acyclic hydrocarbons that comprise at least one tertiary or quaternary carbon bond. Some specific and exemplary examples of suitable branched alkanes include 2-methylpentane, 3-methylpentane, 2,2-dimethylbutane, 2,3-dimethylbutane, 2,2,4-trimethylpentane, 2,3,4-trimethylpentane, 2,2-dimethylpentane, 2,3-dimethylpentane, 2,4-dimethylpentane, 3-methylheptane, 2,2,4,4-tetramethylpentane, and 2,4,7-trimethylnonane, branched isomers thereof that retain at least one tertiary or quaternary carbon bond, and mixtures thereof. Of these particular branched alkanes, 2,3-dimethylbutane, 2,2,4-trimethylpentane, 2,3-dimethylpentane, and 2,4-dimethylpentane are the most preferred. The chemical formulas of these branched alkanes are shown below.

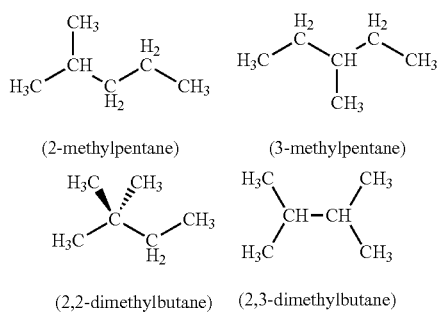

(2-methylpentane)  (3-methylpentane)

(2,2-dimethylbutane)  (2,3-dimethylbutane)

-continued

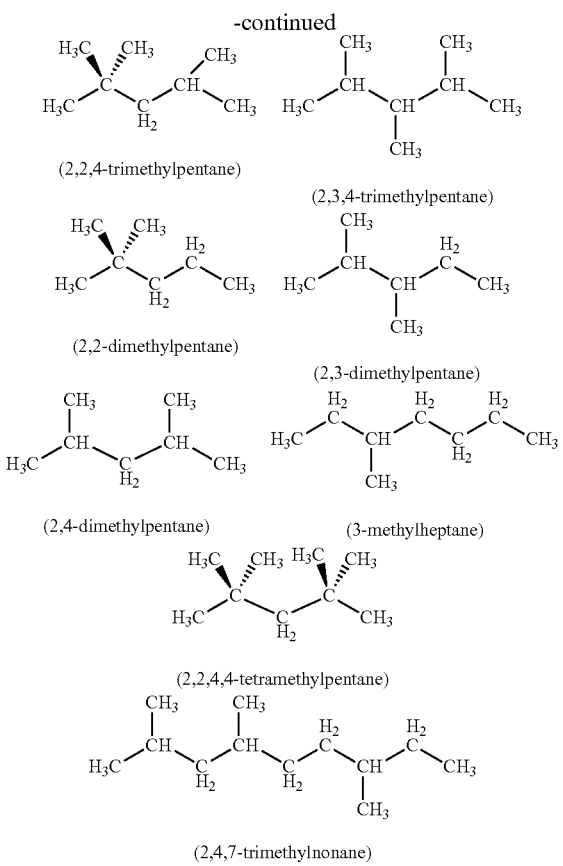

(2,2,4-trimethylpentane)
(2,3,4-trimethylpentane)
(2,2-dimethylpentane)
(2,3-dimethylpentane)
(2,4-dimethylpentane)
(3-methylheptane)
(2,2,4,4-tetramethylpentane)
(2,4,7-trimethylnonane)

The remainder of the endothermic fuel may comprise other combustible hydrocarbons and fuel additives that are commonly found in military-grade jet fuel. These other combustible hydrocarbons usually include normal alkanes, cyclic alkanes, and arenes, each of which is relatively inert or thermally neutral when exposed to the cracking catalyst and, therefore, not expected to meaningfully effect the heat sink capacity of the endothermic fuel. Some examples of commonly employed fuel additives include antioxidants, corrosion-inhibitors, fuel system icing inhibitors, metal deactivators, biocides, and thermal stability improver agents (JP8±100 additives). The exact chemical identity and amount of the other combustible hydrocarbons and fuel cell additives that may be included in the endothermic fuel are generally known to skilled artisans and need not be further discussed here.

The endothermic fuel can be commercially obtained or derived through known fuel synthesis techniques. Fisher-Tropsch (FT) synthetic fuels are a class of jet fuels that are relatively rich in branched alkanes (greater than 30 wt. %) and contain very small amounts of olefins and sulfur-containing compounds (less than 0.5 wt. % and 100 ppm, respectively). The synthetic fuel may be further additized with a particular branched alkane or a mixture of certain branched alkanes from those mentioned above to achieve a desired formulation. A variety of FT synthetic fuels are commercially available from companies such as, for example, Syntroleum Corporation (Tulsa, Okla.), Sassol Ltd. (Johannesburg, South Africa), and Shell (Bintulu, Malaysia). Traditional petroleum-derived kerosene-type jet fuels, such as JP-8 and JP-5, generally contain less branched alkanes and more olefins and sulfur-containing compounds that synthetic jet fuel. But they may be treated, additized with one or more branched alkanes, or mixed with a synthetic jet fuel, for example, to achieve a desired formulation conducive to low-temperature endothermic cracking in the presence of the cracking catalyst. Petroluem-derived kerosene-type jet fuels are commercially available from numerous jet fuel suppliers around the world.

The cracking catalyst includes a superacid supported on a support substrate. The superacid, as already indicated, is operative to induce endothermic catalytic cracking of the branched alkanes at a temperature below about 80° C. A superacid is generally defined as an acid that exhibits an acidity greater than pure sulfuric acid ($H_2SO_4$). The tertiary and/or quaternary carbon bonds in the branched alkanes are attacked by the superacid to facilitate cracking into lighter hydrocarbon compounds. Several superacides that may be used to construct the cracking catalyst include trifluoromethane sulfonic acid (triflic acid), 1,1,2,2-tetrafluoroethane sulfonic acid (TFESA), perfluoro(2-ethoxyethane) sulfonic acid, fluorosulfonic acid, fluoroantimonic acid (a mixture of antimony pentafluoride and hydrofluoric acid usually at a molar ratio of 1.0±0.5), magic acid (a mixture of antimony pentafluoride and fluorosulfonic acid usually at a molar ratio of 1.0±0.5), and mixtures thereof. The chemical formulas of these superacids are shown below.

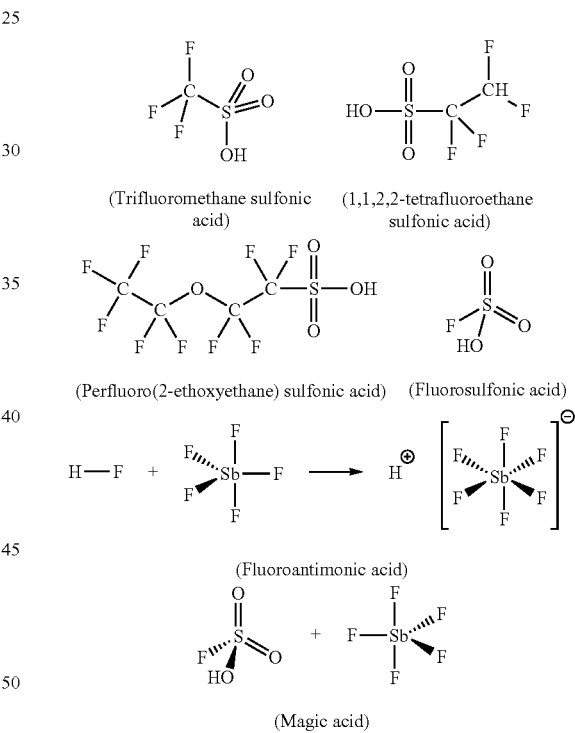

(Trifluoromethane sulfonic acid)
(1,1,2,2-tetrafluoroethane sulfonic acid)
(Perfluoro(2-ethoxyethane) sulfonic acid)
(Fluorosulfonic acid)
(Fluoroantimonic acid)
(Magic acid)

The superacid is preferably supported on an inert, high-surface area support substrate. Immobilizing the superacid in this way allows the cracking catalyst to be washcoated or otherwise confined to a stationary location accessible to the endothermic fuel within the aircraft. Small silica ($SiO_2$) particles, including those of silica xerogel, are a suitable support substrate. The silica particles may be conditioned before being loaded with the superacid to promote more effective superacid catalytic activity. Residual water retained in the silica particles and surface hydroxyl groups, for instance, are believed to interfere with the catalytic activity of the supported superacid to some extent. The potentially detrimental effects of water and surface hydroxyls can be countered by treating the silica particles with trifluoromethansulfonic anhydride (or triflic anhydride) and/or hexamethyldisilazane (HDMS). Triflic anhydride reacts with water to form triflic acid and HDMS reacts with surface hydroxyl groups to neutralize them. The chemical formulas for triflic anhydride and HDMS are shown below.

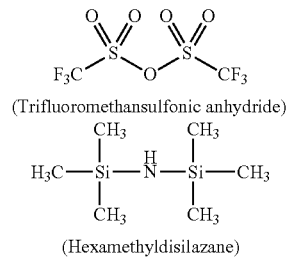

(Trifluoromethansulfonic anhydride)

(Hexamethyldisilazane)

The amount of the superacid needed to drive cracking of the branched alkanes included in the endothermic fuel depends on several variables including the superacid or superacids used, the composition of the endothermic fuel, and the flow rate of the endothermic fuel over the cracking catalyst. The relevant technical knowledge of skilled artisans, empirical data, theoretical considerations, and/or simple trial and error can be consulted to determine the proper superacid content needed for a given set of cracking circumstances. A superacid content that is generally sufficient to effect the heat sink capacity of the endothermic fuel through the catalytic cracking of the branched alkanes is about 150 grams or greater for every kilogram of the endothermic fuel that flows over the cracking catalyst per minute. A preferred loading of the superacid according to the same endothermic fuel mass flow constraint is about 200 grams to about 400 grams.

FIG. 1 generally and schematically depicts a fuel circulation system 10 that cooperatively uses the endothermic fuel and the cracking catalyst to promote low-temperature heat sink capacity gains in the fuel. The fuel circulation system 10 brings an endothermic fuel flow into thermal communication with one or more operating systems 12 installed on the aircraft to accept waste heat 14 generated by those systems. The fuel circulation system 10 includes a fuel reservoir 16 that stores a reserve 18 of the endothermic fuel, a jet engine 20 configured to selectively receive and combust a variable amount of the endothermic fuel, a fuel delivery passage 22 in fluid communication with the fuel reservoir 16 and the jet engine 20, a fuel return passage 24 in fluid communication with the fuel delivery passage 22 and the fuel reservoir 16, and a cracking catalyst cell 26 situated in fluid communication with the fuel delivery passage 22 and/or the fuel return passage 24 and exposed to the endothermic fuel flow.

The aircraft is equipped with numerous interrelated operating systems 12 that collectively generate a significant quantity of waste heat 14 while performing their intended functions. These operating systems include a full authority digital engine control (FADEC), a multi-functional active electronically scanned array (AESA) radar system, weapons guidance and delivery systems, global positioning and navigation systems, secure and jamming-resistant communications systems, instrument lighting systems, the jet fuel starter and emergency power unit, and hydraulic systems that open and close weapon storage compartments, to name but a few. The box labeled "operating systems" and designated by numeral 12 in FIG. 1 is intended to encompass an arrangement of some or all of the operating systems just mentioned including other unrecited operating systems even though only a single box is illustrated for simplicity.

The endothermic fuel flow originates from the fuel reservoir 16 and is continuously delivered through the fuel delivery conduit 22 and into thermal communication with the operating systems 12. Rapid overheating of the operating systems 12 is avoided by rejecting the generated waste heat 14 to the endothermic fuel flow. The thermal communication experienced between the endothermic fuel flow and the operating systems 12 encompasses both direct and indirect heat transfer configurations. A direct heat transfer configuration communicates the waste heat 14 to the endothermic fuel flow through a shared, thermally-conductive surface such as cooling tubes embedded in the chassis of one or more of the operating systems 12. An indirect heat transfer configuration (see FIG. 2) communicates the waste heat 14 to the endothermic fuel flow by way of a cooling fluid that circulates between the one or more operating systems 12, where the cooling fluid accepts waste heat, and a heat exchanger, where the cooling fluid discharges heat to the endothermic fuel flow. A combination of direct and indirect heat transfer configurations may be employed along the route traveled by the endothermic fuel flow.

The endothermic fuel flow is made available to the jet engine 20 for combustion after accepting the waste heat 14 from the operating systems 12. The jet engine 20 may include primary combustion section fuel spray nozzles and afterburner fuel spray nozzles that distribute precise amounts of the endothermic fuel into an incoming air stream for combustion in a primary combustion section or a downstream exhaust section. Combustion of the endothermic fuel in the jet engine 20 produces or augments (i.e., in the case of an afterburner) a high-velocity exhaust jet 28 that upon release not only provides a net forward thrust vector to propel the aircraft but also removes from the aircraft any waste heat 14 captured from the operating systems 12. The jet engine 20 may combust some or all of the endothermic fuel flow. The proportion of the endothermic fuel flow delivered to the jet engine 20 for combustion depends on the current fuel-burn rate dictated by the aircraft propulsion requirements. The entire endothermic fuel flow may be combusted in the jet engine 20, for example, during take-off or low-altitude acceleration to supersonic speeds. Conversely, only a portion of the endothermic fuel flow may be combusted in the jet engine 20 during idle-descent or subsonic high-altitude cruising. Any engine design that can generate the thrust needed to achieve supersonic speeds may be employed as the jet engine 20 in the fuel circulation system 10. A few suitable engine design-types include a turbojet engine, a turbofan engine, a ramjet engine, or a liquid-fueled rocket engine.

Any portion of the endothermic fuel flow not delivered to the engine 20 for combustion is returned to the fuel reservoir 16 through the fuel return passage 24. The returned endothermic fuel is mixed with the fuel reserve 18 to distribute the previously captured waste heat 14 amid a larger thermal mass of endothermic fuel. Over time the bulk temperature of the endothermic fuel reserve 18 begins to progressively increase on account of heat accumulation. The rate of bulk temperature increase typically accelerates as the fuel reserve 18 diminishes during flight. The escalating temperature of the endothermic fuel reserve 18 can eventually affect the efficiency of the fuel circulation system 10 and adversely impact other related components or equipment. Delicate electronics, gaskets, and other sensitive equipment that contact the endothermic fuel reserve 18 and/or the endothermic fuel flow, for example, may begin to malfunction or, worse yet, suffer damage, if exposed to fuel that exceeds a maximum allowable temperature limit that usually lies somewhere in the range of 60° C. to 85° C.

The endothermic fuel flow is exposed to the cracking catalyst cell 26 before, during, or after accepting the waste heat 14 from the operating systems 12. The cracking catalyst cell 26 is a compilation of the cracking catalyst immobilized within the flow path of the endothermic fuel flow that comprises an ample amount of the superacid or superacids employed to facilitate low-temperature cracking of the branched alkanes. The immobilized compilation may be a coating, a molecular sieve structure, a particle bed, or some other suitable stationary catalytic structure. The low-temperature catalytic activity of the cracking catalyst permits endothermic cracking to be performed in a variety of stationary applications throughout the fuel circulation system. The endothermic fuel flow does not necessarily have to be delivered to the highest-temperature regions of the aircraft (i.e., the leading edge of a wing) to facilitate this particular endothermic reaction. Several non-limiting and relative locations where the cracking catalyst cell 26 may be located within the fuel circulation system 10 are shown in FIG. 1.

The cracking catalyst cell 26 initiates cracking of the branched alkanes at temperatures as low as about 20° C. to about 80° C. The negative heat of reaction attributable to such catalytic cracking consumes available heat present in the endothermic fuel flow. Any temperature increase that has occurred (if cracking is during or after acceptance of waste heat) or will occur (if cracking is before acceptance of waste heat) in the endothermic fuel flow relative to the temperature of the aircraft's fuel reserve 18 is offset to a corresponding thermal extent. Only the residual waste heat 14 captured from the operating systems 12 but not consumed in the endothermic cracking reaction, if any, is available to affect a temperature increase in the endothermic fuel flow. As a result, the bulk temperature of the endothermic fuel reserve 18 is increased, over time, at a mitigated rate when any portion of the endothermic fuel flow is returned to the fuel reservoir 16.

Several related efficiencies can be achieved in the fuel circulation system 10 by the ability to withstand unmitigated bulk temperature rate increases in the fuel reserve 18 as a result of sustained re-introduction of the endothermic fuel flow. A more efficient heat flux from the one or more operating systems 12 to the endothermic fuel flow and an improvement in the overall heat sink capacity of the endothermic fuel reserve 18 are the most prevalent efficiencies realized. The aircraft's flight envelope, endurance (time aloft), and/or range may also be expanded since the fuel reserve 18 takes more time to heat up to the maximum allowable temperature limit where damage to contacting gaskets and sensitive electronic components occurs.

Figure 2:
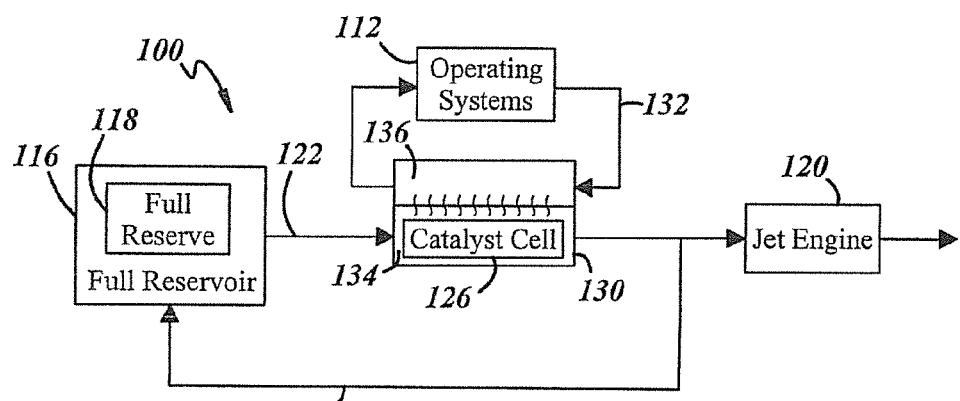
FIG. 2 generally and schematically depicts a fuel circulation system that uses a reactive heat exchanger to achieve thermal communication between an endothermic flow capable of low temperature cracking and one or more operating systems installed on the military aircraft.

FIG. 2 generally and schematically depicts a fuel circulation system 100 that illustrates a preferred embodiment of the fuel circulation system 10 shown in FIG. 1. The fuel circulation system 100 includes a reactive heat exchanger 130 that achieves thermal communication between the endothermic fuel flow and the operating systems 112 and, at the same time, exposes the endothermic fuel flow to the cracking catalyst cell 126. The reactive heat exchanger 130 is any suitable heat exchanger that can be used in the fuel circulation system 100 to transfer heat between isolated fluid flows. The remainder of the fuel circulation system 100 functions the same as previously described.

The reactive heat exchanger 130 fluidly communicates with the fuel delivery passage 122 and a closed-looped cooling passage 132. The fuel delivery passage 122 delivers the endothermic fuel flow from the fuel reservoir 116 and through a contained fuel segment 134 in the reactive heat exchanger 130 in route to the jet engine 120. The closed-looped cooling passage 132 continuously circulates a cooling fluid flow from the operating systems 112, through a contained cooling fluid segment 136 in reactive heat exchanger 130, and back to the operating systems 112. Each of the fuel segment 134 and the cooling fluid segment 136 may include tubes, grooves, or channels that are situated in a desired flow arrangement (i.e., cross-flow, counter-flow, parallel flow) relative to one another. Those two segments 134, 136 are also separated by a thin-walled thermally conductive material that facilitates efficient heat flux from the warmer cooling fluid flow to the colder endothermic fuel flow. The cooling fluid that circulates through the closed-loop cooling fluid passage 132 may be turbine oil, a polyalphaolefin (PAO), a glycol-water mixture, or some other appropriate heat transfer fluid.

The fuel segment 134 of the reactive heat exchanger 130 houses the cracking catalyst cell 126 within the flow path of the endothermic fuel flow. The cracking catalyst cell 126 preferably constitutes a washcoat of the cracking catalyst applied to an interior wall surfaces or surfaces of the fuel segment 134 over which the endothermic fuel flow navigates. Such a location is preferred because it optimizes the reactive heat exchanger's 130 functionality per unit volume and may permit the fuel circulation system 100 to be retrofit into pre-existing fuel circulation system architectures. The washcoat may be prepared to a desired thickness by applying a slurry of the cracking catalyst to the desired surface, and then calcining the applied slurry to remove volatile solvents and affect any intended material phase transitions. Washcoating techniques and their many application-specific intricacies are generally known to skilled artisans and need not be further described here.

The simultaneous progress of the endothermic fuel flow and the cooling fluid flow through their respective segments 134, 136 of the reactive heat exchanger 130 not only rejects the operating systems' 112 waste heat to the endothermic fuel but also facilitates the endothermic catalytic cracking of the branched alkanes. The constant heat flux distributed between those two flows provides the cracking catalyst cell 126 with steady access to appreciable heat. This available heat flux augments the heat carried in the endothermic fuel flow and boosts the reaction kinetics associated with catalytic cracking of the branched alkanes particularly when the endothermic fuel flow exhibits a low temperature, for example, during the early stages of flight. On account of the sensible heat absorbed by the cracking catalyst cell 126 and the negative heat of reaction associated with catalytically cracking branched alkanes, only a portion of the waste heat rejected by the cooling fluid flow in the reactive heat exchanger 130 actually contributes to a temperature increase in the endothermic fuel flow over the course of the aircraft's flight. This mitigated temperature increase in the endothermic fuel flow, as already discussed, keeps the bulk temperature of the fuel reserve 118 from rising too fast when some or all of the endothermic fuel flow is returned to the fuel reservoir 116 (through the fuel return conduit 124) over time.

The specific embodiments described in this application are merely descriptive in nature and are not intended to limit or strictly define the scope of the claims that follow. Various modifications can be made to those representative embodiments without departing from scope of the claims as will be appreciated by skilled artisans.

The invention claimed is:

1. A method for rejecting waste heat produced by one or more operating systems carried on an aircraft, the method comprising:
   supplying an endothermic fuel flow from an endothermic fuel reserve contained in a fuel reservoir, the endothermic fuel comprising an effective amount of branched alkanes so that the endothermic fuel achieves a net endothermic effect when the branched alkanes undergo endothermic catalytic cracking;

bringing the endothermic fuel flow into thermal communication with one or more operating systems that generate waste heat while performing their intended functions during operation of the aircraft; and exposing the endothermic fuel flow to a cracking catalyst that comprises a superacid operative to catalytically crack the branched alkanes present in the endothermic fuel at a reaction temperature between about 20° C. to about 80° C., the superacid being present in an amount to drive cracking of the branched alkanes and to increase a heat sink capacity of the endothermic fuel flow at the reaction temperature.

2. The method of claim 1, wherein the branched alkanes included in the endothermic fuel comprise at least one of 2-methylpentane, 3-methylpentane, 2,2-dimethylbutane, 2,3-dimethylbutane, 2,2,4-trimethylpentane, 2,3,4-trimethylpentane, 2,2-dimethylpentane, 2,3-dimethylpentane, 2,4-dimethylpentane, 3-methylheptane, 2,2,4,4-tetramethylpentane, 2,4,7-trimethylnonane, branched isomers thereof that retain at least one tertiary or quaternary carbon bond, or mixtures thereof.

3. The method of claim 1, wherein the superacid comprises at least one of trifluoromethane sulfonic acid, 1,1,2,2-tetrafluoroethane sulfonic acid, perfluoro(2-ethoxyethane) sulfonic acid, fluorosulfonic acid, fluoroantimonic acid, magic acid, or mixtures thereof.

4. The method of claim 1, wherein the endothermic fuel comprises greater than 10 wt. % branched alkanes, less than 5 wt. % olefins, and less than 3000 ppm sulfur-containing compounds.

5. The method of claim 1, wherein the endothermic fuel comprises greater than 30 wt. % branched alkanes, less than 3 wt. % olefins, and less than 1000 ppm sulfur-containing compounds.

6. The method of claim 1, wherein the endothermic fuel comprises greater than 50 wt. % branched alkanes, less than 0.5 wt. % olefins, and less than 100 ppm sulfur-containing compounds.

7. The method of claim 1, wherein the superacid is present at about 150 grams or greater for every kilogram of the endothermic fuel that flows over the cracking catalyst per minute.

8. The method of claim 1, wherein the superacid is present at about 200 to about 400 grams for every kilogram of the endothermic fuel that flows over the cracking catalyst per minute.

9. The method of claim 1, wherein the cracking catalyst further comprises an inert support substrate that supports and immobilizes the superacid within a flow path of the endothermic fuel flow.

10. The method of claim 9, wherein the inert support substrate comprises silica particles that have been conditioned with at least one of trifluoromethansulfonic anhydride, hexamethyldisilazane, or a mixture thereof.

11. The method of claim 1, further comprising:
delivering the endothermic fuel flow to a jet engine configured to receive and selectively combust at least some of the endothermic fuel flow either before or after being exposed to the cracking catalyst; and
delivering at least some of the endothermic fuel flow not combusted in the jet engine back to the fuel reservoir after the endothermic fuel flow has been exposed to the cracking catalyst.

12. The method of claim 1, wherein bringing the endothermic fuel flow into thermal communication with the one or more operating systems and exposing the endothermic fuel flow to the cracking catalyst comprises:

passing the endothermic fuel flow through a fuel segment of a reactive heat exchanger, the fuel segment comprising a washcoat within a flow path of the endothermic fuel flow that includes the cracking catalyst; and circulating a cooling fluid flow through the one or more operating systems, where waste heat is accepted, then through a cooling fluid segment of the reactive heat exchanger to transfer heat to the endothermic fuel flow in the fuel segment, and then back to the one or more operating systems.

13. A method for rejecting waste heat produced by one or more operating systems carried on an aircraft, the method comprising:

bringing an endothermic fuel flow into thermal communication with one or more operating systems that generate waste heat while performing their intended functions during operation of the aircraft, the endothermic fuel comprising greater than 10 wt. % branched alkanes, less than 5 wt. % olefins, and less than 3000 ppm sulfur-containing compounds; and exposing the endothermic fuel flow to a cracking catalyst that is immobilized within a flow path of the endothermic fuel flow, the cracking catalyst comprising a superacid supported on an inert support substrate, the superacid being selected from the group consisting of trifluoromethane sulfonic acid, 1,1,2,2-tetrafluoroethane sulfonic acid, perfluoro(2-ethoxyethane) sulfonic acid, fluorosulfonic acid, fluoroantimonic acid, magic acid, or a mixture thereof, and being present at about 150 grams or greater for every kilogram of the endothermic fuel that flows over the cracking catalyst per minute.

14. The method of claim 13, wherein the inert support substrate comprises silica particles that have been conditioned with at least one of trifluoromethansulfonic anhydride, hexamethyldisilazane, or a mixture thereof.

15. The method of claim 13, wherein the branched alkanes included in the endothermic fuel comprise at least one of 2-methylpentane, 3-methylpentane, 2,2-dimethylbutane, 2,3-dimethylbutane, 2,2,4-trimethylpentane, 2,3,4-trimethylpentane, 2,2-dimethylpentane, 2,3-dimethylpentane, 2,4-dimethylpentane, 3-methylheptane, 2,2,4,4-tetramethylpentane, 2,4,7-trimethylnonane, branched isomers thereof that retain at least one tertiary or quaternary carbon bond, or mixtures thereof.

16. The method of claim 13, further comprising:
supplying the endothermic fuel flow from an endothermic fuel reserve contained in a fuel reservoir;
delivering the endothermic fuel flow to a jet engine configured to receive and selectively combust at least some of the endothermic fuel flow either before or after being exposed to the cracking catalyst; and
delivering at least some of the endothermic fuel flow not combusted in the jet engine back to the fuel reservoir after the endothermic fuel flow has been exposed to the cracking catalyst.

17. A fuel circulation system for rejecting waste heat produced by one or more operating systems carried on an aircraft, the system comprising:
a fuel reservoir for storing a reserve of an endothermic fuel that contains an effective amount of branched alkanes so that the endothermic fuel achieves a net endothermic effect when the branched alkanes undergo in endothermic catalytic cracking;

one or more operating systems that generate waste heat while performing their intended functions during operation of the aircraft;

a jet engine configured to selectively receive and combust a variable quantity of the endothermic fuel contained in the fuel reservoir;

a fuel delivery conduit for delivering an endothermic fuel flow originating in the fuel reservoir to the jet engine;

a fuel return conduit for returning at least some of the endothermic fuel flow not combusted in the jet engine to the fuel reservoir; and a cracking catalyst cell in fluid communication with either the fuel delivery conduit or the fuel return conduit and exposed within a flow path of the endothermic fuel flow, the cracking catalyst cell comprising an immobilized compilation of a cracking catalyst that includes a superacid operative to induce catalytic cracking of the branched alkanes at a temperature between about 20° C. and about 80° C., and wherein the cracking catalyst cell includes an amount of the superacid to catalytically crack the branched alkanes present in the endothermic fuel and to increase a heat sink capacity of the endothermic fuel flow.

18. The fuel circulation system of claim 17, wherein the endothermic fuel comprises greater than 10 wt. % branched alkanes, less than 5 wt. % olefins, and less than 3000 ppm sulfur-containing compounds, and wherein the branched alkanes comprise at least one of 2-methylpentane, 3-methylpentane, 2,2-dimethylbutane, 2,3-dimethylbutane, 2,2,4-trimethylpentane, 2,3,4-trimethylpentane, 2,2-dimethylpentane, 2,3-dimethylpentane, 2,4-dimethylpentane, 3-methylheptane, 2,2,4,4-tetramethylpentane, 2,4,7-trimethylnonane, branched isomers thereof that retain at least one tertiary or quaternary carbon bond, or mixtures thereof.

19. The fuel circulation system of claim 17, wherein the superacid is present at about 150 grams or greater for every kilogram of the endothermic fuel that flows over the cracking catalyst per minute, and wherein the superacid comprises at least one of trifluoromethane sulfonic acid, 1,1,2,2-tetrafluoroethane sulfonic acid, perfluoro(2-ethoxyethane) sulfonic acid, fluorosulfonic acid, fluoroantimonic acid, magic acid, or mixtures thereof.

20. The fuel circulation system of claim 17, further comprising:

a reactive heat exchanger in fluid communication with either the fuel delivery conduit or the fuel return conduit, the reactive heat exchanger comprising a fuel segment and a cooling fluid segment that are isolated from each other by a thermally-conductive material, the fuel segment being configured to communicate the endothermic fuel flow through the reactive heat exchanger, and the cooling fluid segment being configured to communicate a cooling fluid flow, which circulates between the one or more operating systems and the reactive heat exchanger, through the cooling fluid segment of the reactive heat exchanger to transfer heat to the endothermic fuel flow.

* * * * *